United States Patent

Gross et al.

[11] 3,882,706
[45] May 13, 1975

[54] METHOD AND APPARATUS FOR PRODUCING HELICAL SEAM WELDED STEEL

[76] Inventors: Heinz Gross, Reichsmarkstrasse 142, 4600 Dortmund-Syburg, Germany; Harry C. Wade, 1205 Fennel St. E., Apt. 104, Hamilton, Ontario; John W. Witts, 20 Damode Dr., Fonthill, Ontario, both of Canada

[22] Filed: Aug. 2, 1974

[21] Appl. No.: 494,279

Related U.S. Application Data

[62] Division of Ser. No. 355,663, April 30, 1973, Pat. No. 3,851,376.

[30] Foreign Application Priority Data

May 4, 1972   Germany.............................. 2221776

[52] U.S. Cl...................................... 72/17; 72/171
[51] Int. Cl............................................... B21c 37/02

[58] Field of Search....... 29/477, 477.3, 488; 228/8, 228/9; 72/17, 171, 49

[56] References Cited
UNITED STATES PATENTS
1,884,658   10/1932   Gladkov et al. ..................... 228/17
3,775,835   12/1973   Cauffiel ............................. 29/477.3

Primary Examiner—Milton S. Mehr
Attorney, Agent, or Firm—Toren, McGeady and Stanger

[57] ABSTRACT

In the formation of helical seam welded steel pipe from strip material, variations in the strip material are recorded and compared with nominal values and, based on the differences between the actual and nominal values, the helical bending of the strip material is controlled to maintain the spring back force of the material within permissible limits.

3 Claims, 3 Drawing Figures

METHOD AND APPARATUS FOR PRODUCING HELICAL SEAM WELDED STEEL

This is a divisional application of application Ser. No. 355,663 filed Apr. 30, 1973 now U.S. Pat. No. 3,851,376.

SUMMARY OF THE INVENTION

The present invention is directed to the formation of helical seam welded steel pipes and, more particularly, it involves checking the deformation resistance of the strip material used in forming the pipe and adjusting the helical bending of the pipe in accordance with the variations in deformation resistance.

Helical seam welded steel pipe is produced, as is known, from hot wide strip material, available in coil form or in flat form. Initially, if it is necessary to do so after uncoiling the strip material, it is straightened, and then the edges are cut in the proper form for the welding process. In place of relatively thin wide strip material, it is also possible to use long heavy plates which have not been coiled, for forming the pipe. The preheated wide strip material or heavy plate material, which for simplicity's sake will be called plate strip, is fed by means of a driving unit over guide systems and an edge bending machine to a pipe shaping machine which continuously deforms the plate strip into a cylindrical helical seam pipe body. The edge bending machine through which the plate strip is conducted, takes into account the roofing-over, frequently called the "bamboo effect" in the industry, in the range of the welded seams, which effect usually appears during the manufacture of helical seam pipes. Such edge bending machines are known.

In producing the welded pipe, the helical seam pipe body is supported either by rollers acting on its outer circumference, a so-called roller cage, or by rollers acting on its inner circumference, a so-called roller star. The pipe shaping machine consists, for example, of a three-roll bending machine, which consists of a three-point bending system or of a three-roll bending device and an additional bending roll, which will be more fully described below. The deformation of the plate strip in the pipe shaping machine is effected primarily in the plastic state and, unavoidably, also in the elastic state. To feed the deformed plate strip to the unwelded helical seam pipe body on the rollers of the roller cage or roller star, the pipe body should not completely relax so that a small amount of elastic deformation is maintained. A helical seam pipe body split in the longitudinal direction has a resilience which is characterized as "spring back" in the industry. Further, a distinction is made between positive spring back and negative spring back. Due to variations in the plate strip thickness caused by rolling and also by variations in other material properties, adequate pipe diameter tolerances, but different spring back forces are obtained with constant geometric adjustment of the bending rolls of the pipe shaping machine and of the roller cage.

Since for various reasons all geometric and mechanical values of the pipe strip can be guaranteed only within predetermined tolerances for the application of the pipe, it is necessary to maintain the spring back of helical pipe bodies split in the longitudinal direction within desired given limits.

Therefore, the present invention is directed to the problem of forming helical seam welded pipe by taking into account the fluctuations in the properties of the plate strip used for the pipe body so that the undesired effects of such fluctuations can be avoided.

In accordance with the present invention, the deformation resistance of the plate strip material is measured before it enters the strip bending machine and the measured value is compared with a nominal value for providing a control on the operation of the strip bending machine so that an adjustment can be provided whereby the curvature of the strip material is retained within permissible limits with regard to spring back, despite fluctuations of the properties of the strip material. Naturally, the control of the strip bending machine requires a knowledge of the extent to which variations in the deformation resistance of the strip material affect the pipe to be produced. Such information can be obtained, however, by making certain tests before commencing production of the pipe. In such tests, samples in the form of a ring are cut from welded test pipes, and the rings are cut up lengthwise and the positive or negative spring back is measured. From the test information obtained, it is possible to determine the relationship between spring-back, deformation resistance and the curvature produced in the strip bending machine. From a test series the results of which can be recorded in graphs or tables, it is possible to determine the manner in which the control must be set quantitatively for automatically adjusting the strip bending machine based on fluctuations in the properties of the strip material for producing a pipe whose spring back characteristic remains within permissible limits.

By varying the relative geometric arrangement of the bending rolls of the three-roll bending machine, it is possible to obtain different deformation radii of the strip. However, the requirement for maintaining the spring back of the helical seam pipe within permissible limits cannot always be achieved with the required accuracy. Even a minor variation in the adjustment of the three-roll bending machine during the formation of the helical seam pipe produces, as a result, different diameters and violates other control relations required for the pipe production.

Accordingly, to overcome this disadvantage, the present invention utilizes a strip bending machine in the form of a three-roll bending machine with an additional roll connected to it so that the roll moves transversely of the direction of the movement of the strip as it passes into the machine and the roll controls the entrance angle of the strip in the vertical plane as it enters the machine. The operation of the roll is determined by checking the deformation resistance of the strip upstream from the position at which it enters the bending machine.

In another embodiment of the invention, the pressures developed in the above-mentioned edge bending device are used, as mentioned above, as the actual values, because all quantitative fluctuations in the plate strip material properties, which influence the deformation resistance, result in a variation of the pressures which are developed in the edge bending device.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
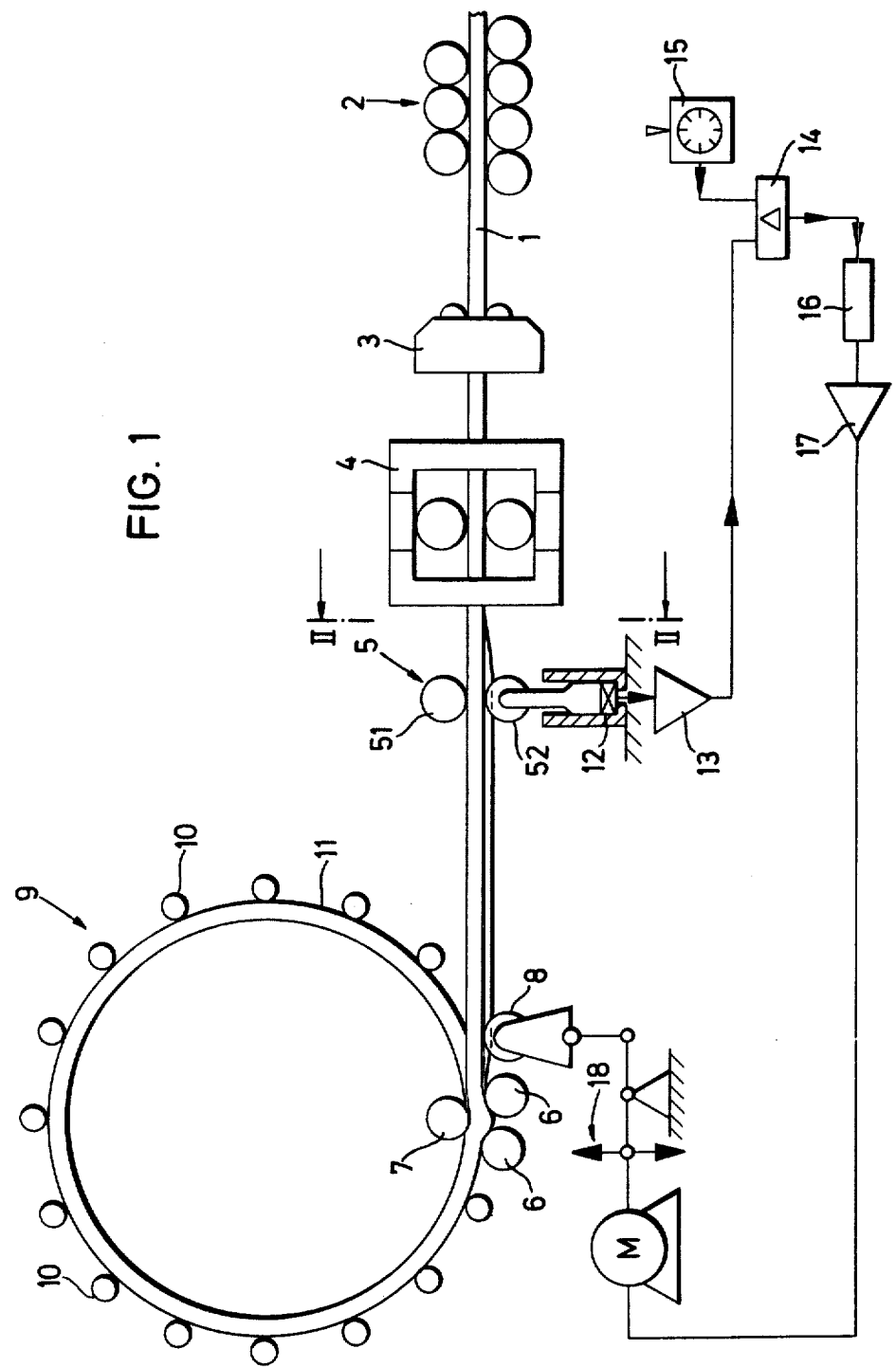
FIG. 1 is a schematic showing, in elevation, of a plant for the production of helical seam welded pipes.
Figure 2:
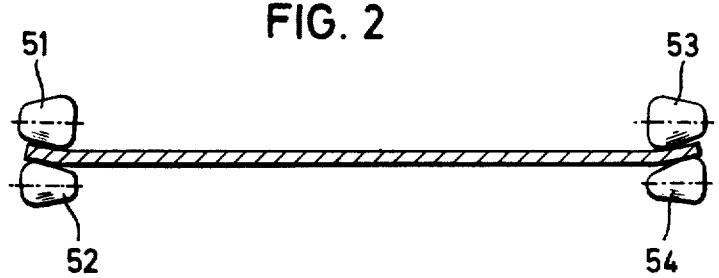
FIG. 2 is a cross sectional view taken along the line II—II in FIG. 1.
Figure 3:
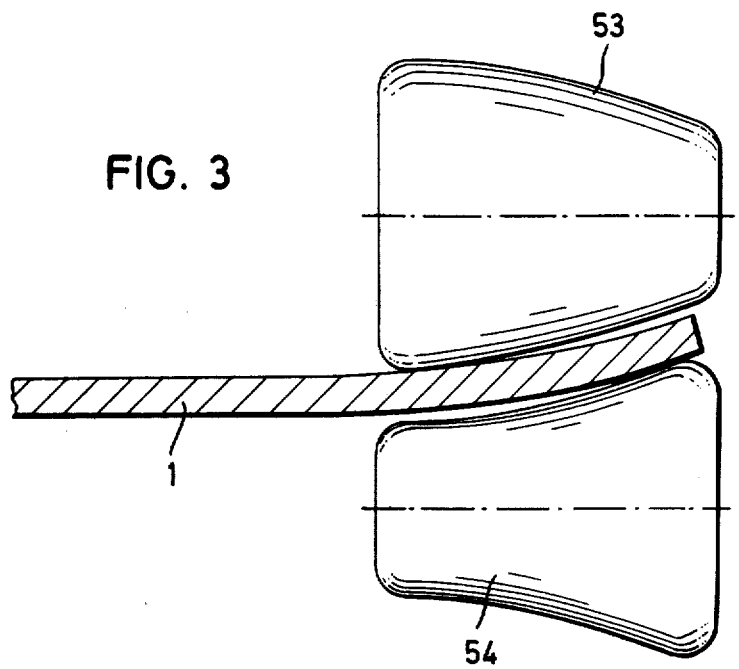
FIG. 3 is an enlarged detail of a portion of FIG. 2.

As shown in FIG. 1, plate strip material 1 to be used in forming helical seam welded pipe is straightened in a straightening machine 2 and then passes through an edge trimmer 3 which forms its edges in the proper configuration for the welding operation. Downstream from the edge trimmer, the strip material passes through a main driver stand 4 which effects the feed of the plate strip material through the plant for producing the helical seam welded pipe, and the edges of the strip material are bent, based on the so-called bamboo effect, to compensate for this undesired effect which appears in the finished helical seam pipe. From the main driver stand 4, the plate strip material 1 passes through a bending roll stand 5 and is directed into a pipe bending or shaping machine consisting of the bending rolls 6, 7 and 8. Within this shaping machine the plate strip material is bent to a radius which ensures that its outer surface bears against the rollers 10 of a roller cage 9. The bearing of the curved plate strip on the rollers is achieved only to a minor extent by elastic deformation of the plate strip developed in the shaping machine and almost exclusively by permanent deformation which exceeds the elastic limit. In the embodiment illustrated, the bending rolls 6 located below the strip material and the bending rolls 7 positioned above the strip material are set or fixed so they do not change position during operation, however, the bending roll 8 is displaceable transversely of the direction in which the strip enters the bending machine. The bending stand 5 consists of the bending rollers 51, 52, 53 and 54 represented schematically in FIG. 2. Each pair of the bending rollers 51, 52 and 53, 54 is provided in its support with an inductive pressure cell 12 which transforms pressure increases and decreases developed between the bending rollers which are proportional to the variations in the properties of the plate strip material, into electrical impulses. The electrical impulses are transmitted over an amplifier 13 to a difference-former 14. The results plotted in the testing series, representing nominal values, are stored in the setting means 15. The setting means is interconnected with the difference-former 14.

In this set-up, any instantaneous deviation in the properties of the plate strip material 1 is compared in the difference-former 14 with the nominal values from the setting means 15 and, as a result, any deviation from the nominal value is transformed into an electrical impulse which is fed to a retarding element 16. The retarding element 16 stores the received electrical impulse until the section of the plate strip material which generated the impulse reaches the bending roll 8 at which moment the stored signal is released. The electrical impulse is amplified within amplifier 17 and is fed to an electromotor drive 18 which adjusts the bending roll in the vertical direction over a lever gear represented schematically in FIG. 1. The vertical adjustment of the bending roll, that is in the direction transverse to the movement of the strip material into the bending machine, has a prebending effect on the plate strip material before it passes through the radially fixed bending rolls 6 and 7.

Therefore, since the prebending effect is timed to correspond exactly with the section of the plate strip material which generated the signal, the spring back, which is a function of the residual stresses in the pipe cross section, can be kept within permissible limits.

While a specific embodiment of the invention has been shown and described in detail to illustrate the application of the inventive principles, it will be understood that the invention may be embodied otherwise without departing from such principles.

The embodiments of the invention in which an exclusive property or privilege is claimed are defined as follows:

1. Apparatus for producing helical seam welded pipe from strip material including a strip bending machine comprising a three-roll bending device and a roll located adjacent said three-roll bending device and spaced upstream from it relative to the direction of movement of the strip material, the rolls of said three-roll bending device being fixed and said rolls adjacent to them being movable transverse to the direction of movement of the strip material for controlling the entrance angle of the strip into said three-roll bending device, and means for controlling the movement of said roll based on measurements of the deformation resistance of said strip material made at a position upstream from said roll.

2. Apparatus, as set forth in claim 1, wherein said means for controlling said roll comprises an electromotor drive for adjusting said roll transverse to the direction of movement of the strip.

3. Apparatus, as set forth in claim 2, wherein said means for controlling said roll further comprises bending rolls spaced upstream relative to the direction of movement of the strip material from said roll, an inductive pressure cell operatively connected to said bending rollers for transforming pressure increases and decreases in the strip material proportional to fluctuations in the properties of the strip material into electrical impulses, an amplifier connected to said pressure cell, a difference-former connected to said amplifier, setting means connected to said difference-former and containing nominal values of the strip so that deviations from the nominal values are compared in said difference-former and established as an electrical impulse, means for storing the electrical impulse developed in the difference-former until the section of the strip rendering the impulse reaches said roll, a second amplifier connected to said storing means and to said electromotor device and arranged to receive the electrical impulse from said storing means and to convey it to said electromotor device for adjusting the position of said roll transversely of the direction of movement of the strip material.

* * * * *